United States Patent
Dimter et al.

(10) Patent No.: US 11,565,346 B2
(45) Date of Patent: *Jan. 31, 2023

(54) SELECTIVE LASER SOLIDIFICATION APPARATUS AND METHOD

(71) Applicant: RENISHAW PLC, Gloucestershire (GB)

(72) Inventors: Marc Frank Dimter, Kornwestheim (DE); Ralph Markus Mayer, Kornwestheim (DE); Thomas Hess, Munich (DE)

(73) Assignee: RENISHAW PLC, Wotton-under-Edge (GB)

( * ) Notice: Subject to any disclaimer, the term of this patent is extended or adjusted under 35 U.S.C. 154(b) by 463 days.

This patent is subject to a terminal disclaimer.

(21) Appl. No.: 16/587,146

(22) Filed: Sep. 30, 2019

(65) Prior Publication Data

US 2020/0023463 A1    Jan. 23, 2020

Related U.S. Application Data (63) Continuation of application No. 14/766,627, filed as application No. PCT/GB2014/050417 on Feb. 13, 2014, now Pat. No. 10,493,562.

(Continued)

(30) Foreign Application Priority Data

Feb. 14, 2013 (GB) .................................. 1302602
Mar. 5, 2013 (GB) .................................. 1303920

(51) Int. Cl.
*B23K 26/142* (2014.01)
*B23K 26/342* (2014.01)
(Continued)

(52) U.S. Cl.
CPC ............ *B23K 26/142* (2015.10); *B22F 12/00* (2021.01); *B23K 26/0869* (2013.01);
(Continued)

(58) Field of Classification Search
CPC .... B22F 10/322; B23K 26/142; B32K 26/342
See application file for complete search history.

(56) References Cited

U.S. PATENT DOCUMENTS 5,017,317 A    5/1991 Marcus
5,155,324 A    10/1992 Deckard et al.
(Continued)

FOREIGN PATENT DOCUMENTS

CN    1827283 A    9/2006
CN    101321600 A    12/2008
(Continued)

OTHER PUBLICATIONS

Apr. 29, 2021 Notice of Allowance issued in U.S. Appl. No. 16/838,095.

(Continued)

*Primary Examiner* — Geoffrey S Evans
(74) *Attorney, Agent, or Firm* — Oliff PLC (57) ABSTRACT

Selective laser solidification apparatus is described that includes a powder bed onto which a powder layer can be deposited and a gas flow unit for passing a flow of gas over the powder bed along a predefined gas flow direction. A laser scanning unit is provided for scanning a laser beam over the powder layer to selectively solidify at least part of the powder layer to form a required pattern. The required pattern is formed from a plurality of stripes or stripe segments that are formed by advancing the laser beam along the stripe or stripe segment in a stripe formation direction. The stripe formation direction is arranged so that it always at least (Continued)

partially opposes the predefined gas flow direction. A corresponding method is also described.

16 Claims, 8 Drawing Sheets

Related U.S. Application Data (60) Provisional application No. 61/774,215, filed on Mar. 7, 2013.

(51) Int. Cl.
| | |
|---|---|
| *B29C 64/153* | (2017.01) |
| *B33Y 10/00* | (2015.01) |
| *B33Y 30/00* | (2015.01) |
| *B33Y 50/02* | (2015.01) |
| *B22F 12/00* | (2021.01) |
| *B23K 26/08* | (2014.01) |
| *B28B 1/00* | (2006.01) |
| *B22F 10/10* | (2021.01) |
| *B22F 10/322* | (2021.01) |
| *B22F 10/28* | (2021.01) |
| *B22F 10/366* | (2021.01) |
| *B23K 26/14* | (2014.01) |
| *B22F 12/70* | (2021.01) |

(52) U.S. Cl.
CPC .......... *B23K 26/342* (2015.10); *B29C 64/153* (2017.08); *B33Y 10/00* (2014.12); *B33Y 30/00* (2014.12); *B33Y 50/02* (2014.12); *B22F 10/10* (2021.01); *B22F 10/28* (2021.01); *B22F 10/322* (2021.01); *B22F 10/366* (2021.01); *B22F 12/70* (2021.01); *B22F 2999/00* (2013.01); *B23K 26/1437* (2015.10); *B23K 26/1438* (2015.10); *B28B 1/001* (2013.01); *Y02P 10/25* (2015.11)

(56) References Cited

U.S. PATENT DOCUMENTS

| | | | |
|---|---|---|---|
| 5,352,405 A | 10/1994 | Beaman et al. | |
| 5,534,104 A | 7/1996 | Langer et al. | |
| 5,730,925 A | 3/1998 | Mattes et al. | |
| 6,215,093 B1* | 4/2001 | Meiners | B23K 35/0244 |
| | | | 219/121.84 |
| 6,583,379 B1 | 6/2003 | Meiners et al. | |
| 6,694,207 B2 | 2/2004 | Darrah et al. | |
| 7,047,098 B2 | 5/2006 | Lindemann et al. | |
| 8,034,279 B2 | 10/2011 | Dimter et al. | |
| 9,522,426 B2 | 12/2016 | Das et al. | |
| 10,252,333 B2 | 4/2019 | McMurtry et al. | |
| 10,493,562 B2* | 12/2019 | Dimter | B29C 64/153 |
| 2002/0015654 A1 | 2/2002 | Das et al. | |
| 2004/0099996 A1 | 5/2004 | Herzog | |
| 2005/0116391 A1 | 6/2005 | Lindemann et al. | |
| 2005/0142024 A1 | 6/2005 | Herzog | |
| 2006/0192322 A1 | 8/2006 | Abe et al. | |
| 2006/0249485 A1 | 11/2006 | Partanen et al. | |
| 2008/0241392 A1 | 10/2008 | Dimter et al. | |
| 2009/0017220 A1 | 1/2009 | Muller et al. | |
| 2009/0266803 A1 | 10/2009 | Perret et al. | |
| 2009/0291308 A1 | 11/2009 | Pfister et al. | |
| 2010/0044547 A1 | 2/2010 | Higashi et al. | |
| 2011/0135840 A1 | 6/2011 | Doye et al. | |
| 2011/0221099 A1 | 9/2011 | Oberhofer et al. | |
| 2011/0285060 A1 | 11/2011 | Yamamoto et al. | |
| 2011/0291331 A1 | 12/2011 | Scott | |
| 2012/0061360 A1 | 3/2012 | Idaka et al. | |
| 2012/0251378 A1 | 10/2012 | Abe et al. | |
| 2014/0301883 A1* | 10/2014 | Wiesner | B23K 26/144 |
| | | | 425/162 |
| 2016/0114432 A1 | 4/2016 | Ferrar et al. | |
| 2016/0114531 A1 | 4/2016 | Chuang et al. | |
| 2016/0279706 A1 | 9/2016 | Domrose et al. | |
| 2016/0288209 A1 | 10/2016 | Jakimov et al. | |
| 2017/0136696 A1* | 5/2017 | Jakimov | B22F 10/322 |
| 2018/0185961 A1* | 7/2018 | Meidani | B22F 10/30 |
| 2019/0077077 A1 | 3/2019 | Martin et al. | |

FOREIGN PATENT DOCUMENTS

| | | |
|---|---|---|
| CN | 101653827 A | 2/2010 |
| CN | 101842222 A | 9/2010 |
| CN | 101932429 A | 12/2010 |
| CN | 102164696 A | 8/2011 |
| CN | 102574333 A | 7/2012 |
| CN | 102574333 B | 7/2015 |
| CN | 105500720 A | 4/2016 |
| DE | 39 23 829 A1 | 1/1991 |
| DE | 19514740 C1 | 4/1996 |
| DE | 19649865 C1 | 2/1998 |
| DE | 19853947 C1 | 2/2000 |
| DE | 101 12 591 A1 | 10/2001 |
| DE | 100 42 132 A1 | 3/2002 |
| DE | 100 42 134 A1 | 3/2002 |
| DE | 102 08 150 A1 | 9/2002 |
| DE | 102004031881 A1 | 1/2006 |
| DE | 10 2004 041 633 A1 | 3/2006 |
| DE | 10 2004 057 866 A1 | 6/2006 |
| DE | 10 2006 014835 A1 | 10/2007 |
| DE | 102004031881 B4 | 11/2007 |
| DE | 10 2006 059 851 A1 | 7/2008 |
| DE | 102007014683 A1 | 10/2008 |
| DE | 10 2009 038241 A1 | 3/2010 |
| DE | 10 2010 052 206 A1 | 5/2012 |
| EP | 0 416 852 A2 | 3/1991 |
| EP | 0 429 196 A2 | 5/1991 |
| EP | 0590956 A1 | 4/1994 |
| EP | 0 617 657 B1 | 2/1997 |
| EP | 1234625 A1 | 8/2002 |
| EP | 1419836 A1 | 5/2004 |
| EP | 1839781 A2 | 10/2007 |
| EP | 1 583 626 B1 | 7/2010 |
| EP | 2431113 A1 | 3/2012 |
| EP | 2492084 A1 | 8/2012 |
| EP | 2978589 A1 | 2/2016 |
| GB | 2 046 801 A | 11/1980 |
| GB | 2378151 A | 2/2003 |
| JP | S62-151091 U | 9/1987 |
| JP | 2001-504897 A | 4/2001 |
| JP | 2002-224864 A | 8/2002 |
| JP | 2006-124732 A | 5/2006 |
| JP | 4499934 B2 | 7/2010 |
| WO | 88/02677 A2 | 4/1988 |
| WO | 92/08567 A1 | 5/1992 |
| WO | 92/08592 A1 | 5/1992 |
| WO | 93/08928 A1 | 5/1993 |
| WO | 94/07681 A1 | 4/1994 |
| WO | 98/24574 A1 | 6/1998 |
| WO | 00/30785 A1 | 6/2000 |
| WO | 00/30789 A1 | 6/2000 |
| WO | 03/039844 A1 | 5/2003 |
| WO | 2006/024373 A2 | 3/2006 |
| WO | 2008/116518 A1 | 10/2008 |
| WO | 2009/156316 A1 | 12/2009 |
| WO | 2010/007396 A1 | 1/2010 |
| WO | 2011/049143 A1 | 4/2011 |
| WO | 2014/125258 A2 | 8/2014 |
| WO | 2014/125280 A2 | 8/2014 |
| WO | 2014125281 A2 | 8/2014 |
| WO | 2014/154878 A1 | 10/2014 |
| WO | 2014/154879 A1 | 10/2014 |
| WO | 2014/199150 A1 | 12/2014 |

OTHER PUBLICATIONS

Oct. 9, 2014 Written Opinion issued in International Patent Application No. PCT/GB2014/050418.

(56) References Cited

OTHER PUBLICATIONS

Oct. 9, 2014 International Search Report issued in International Patent Application No. PCT/GB2014/050418.
Aug. 28, 2014 International Search Report issued in International Patent Application No. PCT/GB2014/050417.
Aug. 28, 2014 Written Opinion issued in International Patent Application No. PCT/GB2014/050417.
Apr. 8, 2013 Search Report issued in British Patent Application No. 1303920.1.
Ferrar et al; "Gas flow effects on selective laser melting (SLM) manufacturing performance;" Journal of Materials Processing Technology, Elsevier, NL; Sep. 26, 2011; vol. 212; No. 2; pp. 355-364.
Abe et al; "Influence of forming conditions on the titanium model in rapid prototyping with the selective laser melting process;" Proceedings of the Institution of Mechanical Engineers, Part C, Journal of Mechanical Engineering Science; Mechanical Engineering Publications; Jan. 1, 2003; vol. 217; No. 1; pp. 119-126.
U.S. Appl. No. 14/179,021, filed Feb. 12, 2014 in the name of Ferrar.
U.S. Appl. No. 14/766,627, filed Aug. 7, 2015 in the name of Dimter et al.
Oct. 8, 2015 International Preliminary Report on Patentability and Written Opinion issued in PCT/EP2014/056323.
S. Dadbakhsh et al, "Effect of selective laser melting layout on the quality of stainless steel parts", Rapid Prototyping Journal, vol. 18, Issue 3, pp. 241-249, Apr. 20, 2012.
Aug. 26, 2016 Office Action Issued in U.S. Appl. No. 14/179,021.
Jun. 14, 2016 Office Action issued in Chinese Patent Application No. 201480020782.3.
May 27, 2016 Office Action issued in Chinese Patent Application No. 2014-80020930.1.
Jan. 17, 2017 Notice of Allowance issued in U.S. Appl. No. 14/179,021.
Jan. 25, 2017 Office Action issued in Chinese Office Action 201480020930.1.
Apr. 10, 2017 Office Action issued in Chinese Patent Application No. 201480020782.3.
Aug. 1, 2017 Office Action issued in Chinese Application No. 201480020930.1.
Ferrar et al., "Gas Flow Effects on selective laser melting (SLM) manufacturing performance", Oct. 2011, Elsevier, Journal of Materials Processing Technology, vol. 212, pp. 355-364.
Machine translation of German Patent document DE102004031881, Feb. 2018.
Mar. 5, 2018 Office Action issued in U.S. Appl. No. 14/766,627.
Mar. 13, 2018 Office Action issued in Japanese Application No. 2015-557511.
EOS launches EOSINT M280 metal additive manufacturing system, Industrial Lasers.com website, Mar. 12, 2010.
Mar. 20, 2018 Office Action issued in Japanese Application No. 2015-557513.
Apr. 24, 2018 Search Report issued in European Application No. 17 20 9698.
Laser sintering system EOSINT M 280, "M-Solutions", Jun. 1, 2013, XP055134972.
Aug. 29, 2018 Office Action issued in U.S. Appl. No. 14/777,926.
Sep. 5, 2018 Office Action issued in U.S. Appl. No. 14/766,627.
Jul. 9, 2018 Search Report issued in European Patent Application No. 18161266.4.
"Technical Description EOSINT M 280". EOS GmbH—Electro Optical Systems, 1-33, 2010.
JP-2002224864-A Translation Japanese Language to English Language (Year: 2019).
May 31, 2019 Office Action issued in U.S. Appl. No. 15/461,743.

* cited by examiner

SELECTIVE LASER SOLIDIFICATION APPARATUS AND METHOD

This is a Continuation of application Ser. No. 14/766,627 filed Aug. 7, 2015, which is a National Stage Application of PCT/GB2014/050417 filed Feb. 13, 2014, which in turn claims priority to U.S. Provisional Application No. 61/774,215, filed Mar. 7, 2013. Priority is also claimed to British Application No. 1303920.1 filed Mar. 5, 2013, and British Application No. 1302602.6 filed Feb. 14, 2013. The entire disclosures of the prior applications are hereby incorporated by reference herein in their entirety.

The present invention relates to selective laser solidification and in particular to an improved selective laser melting process and apparatus in which the direction of laser movement across the powder bed is controlled relative to the direction of gas flow.

BACKGROUND

Additive manufacturing or rapid prototyping methods for producing components comprise layer-by-layer solidification of a material, such as a metal powder material, using a laser beam. A powder layer is deposited on a powder bed in a build chamber and a laser beam is scanned across portions of the powder layer that correspond to a cross-section of the component being constructed. The laser beam melts or sinters the powder to form a solidified layer. As explained in more detail below with reference to FIG. 2, it is typical to melt or sinter the desired pattern in the powder layer using a series of stripes. In particular, it is known to advance so-called hatch lines back and forth along a plurality of stripes in turn to construct the desired pattern in the powder layer. After selective solidification of a layer, the powder bed is lowered by a thickness of the newly solidified layer and a further layer of powder is spread over the surface and solidified as required.

During the melting or sintering process, debris (e.g. condensate, unsolidified particles of powder etc) is produced within the build chamber. It is known to introduce a gas flow through the build chamber in an attempt to remove debris from the chamber in the gas flow. For example, the M270 model of machine produced by EOS GmbH, Munich, Germany, passes a flow of gas from the top of the build chamber towards the powder bed and various exhaust vents collect the gas for recirculation. The gas flow in the M270 machine is thus turbulent and has no well defined flow direction. The newer M280 model of machine produced by EOS comprises a series of gas outlet nozzles located to the rear of the powder bed that pass a flow of gas to a series of exhaust vents that are located at the front of the powder bed. In this manner, a planar layer of gas flow is created at the surface of the powder bed. This planar gas flow arrangement has, however, been found by the present inventors to produce high surface roughness and non-uniformity of the solidified metal layers generated by the melting process.

SUMMARY OF THE INVENTION

According to a first aspect of the present invention, there is provided selective laser solidification apparatus, comprising; a powder bed onto which a powder layer can be deposited, a gas flow unit for passing a flow of gas over the powder bed along a predefined gas flow direction, and a laser scanning unit for scanning a laser beam over the powder layer to selectively solidify at least part of the powder layer to form a required pattern, the required pattern being formed from a plurality of stripes or stripe segments, each stripe or stripe segment being formed by advancing the laser beam along the stripe or stripe segment in a stripe formation direction, characterised in that the stripe formation direction is always at least partially opposed to the predefined gas flow direction.

The present invention thus relates to selective laser solidification apparatus, e.g. selective laser sintering or selective laser melting apparatus, in which a powder layer is deposited on a powder bed. A laser scanning unit directs a laser beam onto the surface of the powder layer to solidify (e.g., melt or sinter) selected parts of the powder layer to form a required pattern (e.g. a pattern corresponding to the cross-section of a 3D object that is being constructed). This selective solidification is performed by dividing the area to be scanned by the laser beam into a plurality of stripes or stripe segments. Each stripe or stripe segment is formed by advancing the laser beam along the stripe or stripe segment in a stripe formation direction. As explained below, in a preferred embodiment the laser scanning unit rapidly moves (e.g. scans or steps) a laser spot across each stripe or stripe segment to form a hatch line which is advanced along the stripe or stripe segment in a stripe formation direction. A gas flow unit provides a flow of gas (e.g. a planar gas flow) over the powder bed whilst the stripes are being scanned.

The present inventors have discovered a number of problems that occur when using commercially available selective laser melting machines, such as the EOS M280. In particular, it has been found that debris (e.g. condensate, powder particles etc.) ejected during the laser solidification (e.g. melting) process can be deposited on areas of the powder layer that have yet to be solidified. This has been found to produce additional surface roughness and the formation of layers of non-uniform thickness, which additionally create defects (e.g. pores, inclusions etc). Although altering the way in which the gas flows over the powder bed has been proposed previously, the present inventors have found that the stripe formation direction relative to the gas flow direction has a significant effect on the quality of the layer that is formed. In particular, the present inventors have found that improved powder layer formation occurs if the predefined gas flow direction is always at least partially opposed to the stripe formation direction. In other words, the apparatus can be improved by ensuring there is always a component of the vector that describes the gas flow direction that opposes the vector that defines the stripe formation direction.

It is important to note that the benefits of controlling the stripe formation direction relative to the gas flow direction had not previously been recognised by those skilled in the art. As explained below, prior art techniques typically use stripe patterns in which opposite stripe formation directions are used for adjacent stripes; this is done in order to minimise the time taken to scan a laser beam over the powder layer. For machines in which the gas flow is uncontrolled, the variation in gas flow direction relative to the stripe formation direction is random and simply leads to a general reduction in material uniformity across the powder layer. For machines in which gas flow is provided along a certain predefined direction (e.g. as per the planar flow provided in the EOS M280 machine), the alternating direction of stripe formation direction causes adjacent stripe of solidified material to have different physical properties (e.g. different densities and surface roughness). These variations are visible and produce weaknesses within three dimensional objects constructed from a plurality of such layers.

The present invention, by ensuring the predefined gas flow direction is always at least partially opposed to the stripe formation direction, allows the quality and uniformity of components made by laser solidification to be improved. Ensuring that stripe or stripe segment formation does not occur in the presence of a "tail wind" means that less ejected debris (condensate, powder particles etc) is deposited on powder that is molten or is yet to be melted. Debris is thus carried away from the melt front (i.e. the part of the stripe that is presently in the molten state) and the accumulation of debris at the melt front that is otherwise seen is avoided. Preventing or reducing debris accumulation at the melt front, and deposition on top of regions of the powder layer that have not yet been solidified, not only improves layer thickness and process uniformity but can also improve the overall efficiency of the solidification process. In particular, preventing such a build up of debris ensures that there is no significant attenuation of the laser beam by debris before it reaches the powder layer to be solidified (thereby ensuring efficient solidification) and also prevents previously deposited debris from being re-melted and ejected again from the surface.

The present invention is characterised by the stripe formation direction always being at least partially opposed to the predefined gas flow direction. In other words, there is always a component of the stripe formation direction vector that is in the opposite direction to the gas flow direction vector. The stripe formation direction may be completely opposite (anti-parallel) to the gas flow direction or there may be an oblique angle (e.g. of less than 80°, more preferably of less than 70° or more preferably of less than 60°) between the stripe formation direction and the gas flow direction. It should be noted that the sign of such an oblique angle must still be selected to ensure that stripe formation direction is always at least partially opposed to the predefined gas flow direction. Providing a stripe formation direction that is completely opposite (anti-parallel) to the gas flow direction provides optimum performance, but maintaining a single stripe formation direction when constructing objects from multiple layers may not always be desirable, as described in more detail below. Conveniently, the stripe formation direction subtends an angle ($\alpha$) of at least 10° to the normal to the gas flow direction. More preferable, the angle ($\alpha$) is at least 15°, 20°, 25°, 30°, 35°, 40°, or 45. In a preferred embodiment, the stripe formation direction subtends an angle ($\alpha$) of more than 30° to the normal to the gas flow direction. This ensures that any hatch lines that are used to form the stripes do not become parallel or substantially parallel to the direction of gas flow.

In addition to controlling the stripe formation direction relative to the predefined gas flow direction, it has been found that the order in which the plurality of stripes or stripe segments are formed can affect the uniformity and roughness (e.g. the density) of the solidified layer. If the flow of gas over the powder bed originates from a first side of the powder bed (e.g. if a gas outlet is provided at the first side of the powder bed), it is preferred that the plurality of stripes or stripe segments are formed in reverse order of their proximity to the first side of the powder bed. Forming the stripes or stripe segments in such an order ensures that debris (e.g. condensate or ejected particles) generated at the melt front is carried by the gas flow to areas of the powder layer that have already been solidified, rather than being deposited on material that has yet to be solidified. This ensures that subsequent solidification is only of the fresh powder layer (i.e. a powder layer on which minimal debris has been deposited). This again helps improve layer thickness uniformity and reduces surface roughness, thereby reducing defects.

The gas flow unit passes gas over the powder bed along a predefined gas flow direction. The gas flow may be along a linear gas flow direction or it may be along a non-linear (e.g. curved) gas flow direction. The gas flow direction may vary as a function of the position on the powder bed. Preferably, the gas flow direction is uniform over the powder bed (e.g. a planar gas layer may be produced). The gas flow unit may comprise at least one gas outlet. The at least one gas outlet may comprise a linear bar with a plurality of spaced apart gas nozzles. The gas flow unit may comprise at least one gas exhaust. The at least one gas exhaust may comprise a linear bar with a plurality of exhaust vents. The gas flow unit may include a gas pump. The at least one gas outlet and the at least one gas exhaust are preferably placed either side of the powder bed such that gas pumped from the at least one gas outlet passes to the at least one gas exhaust. Preferably, a substantially planar flow of gas is generated along the predefined gas direction. Preferably, a substantially laminar flow of gas is generated along the predefined gas direction. This planar or laminar flow of gas may be generated by passing gas from the at least one gas outlet passes to the at least one gas exhaust.

Advantageously, the gas flow unit generates a gas flow that moves with a velocity of at least 2 m/s over the powder bed. The gas flow rate is preferably selected so as to not disturb any deposited powder layer, but to allow ejected debris to be blown clear. Any gas, e.g. air, may be passed over the powder bed.

Advantageously, an inert gas is passed over the powder bed. The inert gas may be at least one of nitrogen, argon and helium.

The required pattern may be formed from a plurality of stripes. The stripes may be elongate stripes. The plurality of stripes may comprise stripes of any shape. For example, a plurality of curved stripes may be formed. Preferably, each of the plurality of stripes comprises a linear stripe having an elongate axis. The stripe formation direction is then preferably parallel to the elongate axis of the stripe. The plurality of stripes may be formed in any order, although as described above it is preferred to form stripes in reverse order of their proximity to the source of the gas flow. The laser beam may be advanced along an entire stripe before moving on to the next stripe. In other words, selective melting of one stripe may be completed before starting to melt a different stripe. Alternatively, only a part or section of one stripe may be formed before moving onto a part or section of another stripe. It is, of course, possible for only part of a stripe to be solidified in order to define the part of the pattern that is contained within that stripe. The apparatus may include a controller for controlling the laser scanning unit that defines the plurality of stripes that are to be used. Each stripe may have a width of at least 5 mm, at least 10 mm, at least 15 mm or at least 20 mm. Each stripe may have a width of no more than 50 mm, 40 mm, 30 mm or 20 mm.

The required pattern may alternatively be formed from a plurality of stripe segments. For example, the required pattern may be formed from a regular grid of stripe segments that form a checkerboard pattern. The checkerboard pattern may comprise a plurality of square or rectangular stripe segments. The stripe segments may all be the same size or may be different sizes. An irregular pattern of stripe segments (e.g. islands) may also be formed. The formation of such stripe segments or sections is described in, for example, US2005/0142024. All the stripe segments within a layer may be formed by advancing the laser beam along the same stripe formation direction. Alternatively, a plurality of different stripe formation directions may be used for different stripe segments of a powder layer. For example, the different stripe segments may be formed using different stripe formation directions. As explained above, the present invention ensures the stripe formation direction is always at least partially opposed to the gas flow direction when writing each stripe segment.

The laser scanning unit may comprise a pulsed laser. Preferably, the laser scanning unit comprises a continuous wave (CW) laser. The laser scanning unit may include a laser beam modulator. The modulator may then modulate (e.g. activate or deactivate) the laser beam that impinges on the powder layer. In this manner, laser solidification can be controlled by turning on and off the laser beam as required. Alternatively, the laser power may be modulated, e.g. a sine wave modulation may be applied. The laser scanning unit may generate a laser beam of sufficient power to sinter and/or melt a powder layer. The power of the laser beam may be adjustable by a user.

The laser scanning unit may generate a laser beam that is appropriately shaped (e.g. by beam shaping optics) to form a variable length laser line having a long axis that extends across the stripe or stripe segment. In such an example, the pattern within the stripe is formed by advancing the laser line along the stripe or stripe segment in the stripe formation direction. Advantageously, the laser scanning unit generates a laser spot that is moved (e.g. stepped or scanned) across the stripe to form a so-called hatch line. The laser spot may have a substantially circular cross-sectional profile (e.g. a Gaussian beam profile). The laser scanning unit may form the hatch line by rapidly moving (e.g. stepping or scanning) the spot from one side of the stripe to the other. This may be done using appropriate beam steering optics of the laser scanning unit. Preferably, each of the plurality of stripes or stripe segments are formed using a plurality of hatch lines that are advanced along the stripe formation direction, in other words, hatch lines across the stripe or stripe segment are formed in succession with each hatch line being located further along the stripe formation direction than the preceding hatch line. It should, of course, be noted that not all of the powder layer within a stripe or stripe segment may need to be melted to form the desired pattern. The formation of partial hatch lines, or the omission of hatch lines along selected parts of a stripe or stripe segment, would be possible by appropriate control of the laser scanning unit.

The apparatus may form the series of hatch lines by raster scanning the laser beam back and forth across the stripe or stripe segment. The series of hatch lines may also be formed by rapidly stepping the laser beam back and forth across the stripe or stripe segment. The formation of such bidirectional hatch lines (i.e. hatch lines formed by laser motion across the width of the stripe in two, opposite, directions) is the conventional hatch line formation technique used to form the required pattern along a stripe. As is also known, the laser beam may be deactivated when the beam steering optics are being used to reposition the laser beam from one hatch line to another.

The apparatus of the present invention may form the plurality of stripes or stripe segment using bidirectional hatch lines. Alternatively, a series of hatch lines may be formed by only moving the laser beam in the same line direction across the stripe or stripe segment. In other words, unidirectional hatch lines may be formed. Preferably, the line direction across the stripe or stripe segment is at least partially opposed to the gas flow direction. In this manner, debris ejected during hatch line formation is carried away from the direction in which the laser beam is advancing across the stripe or stripe segment. Although the improvement associated with using unidirectional hatch lines is relatively small compared to the benefits of aligning the stripe formation direction to the gas flow direction, it does still provide a useful improvement. This is, however, at the expense of significantly reducing the speed at which the hatch lines can be written.

In one embodiment, the way in which the hatch lines are formed may be varied during use. In particular, the way in which the hatch lines are formed may be selected depending on the orientation of the stripe formation direction relative to the gas flow direction. In other words, the line direction may be selected based on the orientation of the stripe formation direction relative to the gas flow direction. If the angle ($\alpha$) between the stripe formation direction and the normal to the gas flow direction is substantial (e.g. greater than 10°, 20° or 30°) then bidirectional hatch lines may be used without any substantial degradation in layer formation. However, for smaller angles (e.g. $\alpha$ less than 10°, 20° or 30°) it may be advantageous to use unidirectional hatch lines. In such a case, the line direction can be selected to at least partially oppose to the gas flow direction.

Apparatus of the present invention is typically used to build, layer-by-layer, three dimensional objects. The apparatus is thus preferably arranged to deposit and selectively solidify a plurality of powder layers, each layer deposited on top of the preceding layer, to form a three dimensional object. It is preferred that the layer formation technique of the present invention is applied to each layer, in turn, of the object that is formed. In particular, the required pattern of each powder layer may be formed from a plurality of stripes or stripe segments. The stripe formation direction is preferably always at least partially opposed to the predefined gas flow direction for each stripe or stripe segment of each layer. In other words, it is preferred that no stripes or stripe segments are formed that do not meet the requirement that the stripe formation direction is always at least partially opposed to the predefined gas flow direction. This ensures uniformity and tight layer thickness control throughout the three dimensional object.

It should be noted that it is possible to perform a contour scan before and/or after the required pattern has been written into a powder layer using the stripe or stripe segment based formation technique. A contour scan involves rapidly scanning the laser beam around the contour of the part to re-melt/re-solidify material that will form the outer surface of the part being formed. Such a contour scan involves the solidification of only a small amount of material thereby ejecting minimal amounts of debris and can thus be formed in a conventional manner (i.e. with no control over laser beam movement direction relative to the gas flow direction). Such a contour scan may be performed between the stripe formation technique being applied to a plurality of different powder layers.

The apparatus of the present invention preferably also includes powder deposition apparatus for depositing a powder layer onto the powder bed. The powder deposition apparatus preferably comprises a powder dispenser and a powder wiper. The powder bed may also include a moveable platform or table. A base plate may be attached to platform. The height of the platform within the machine may be adjustable to allow the powder bed to be dropped prior to the deposition of a powder layer. Such features are conventional for selective solidification machines and will not be described further herein for brevity.

It has been explained previously in U.S. Pat. No. 8,034, 279 that altering the stripe direction for different layers is advantageous when forming a three dimensional object.

This also applies when using the technique of the present invention. In particular, different stripe formation directions (e.g. differing by 30°) are preferably used for adjacent powder layers. As explained above, it is preferred that the stripe formation direction used for each layer is at least partially opposed to the gas flow direction.

Apparatus of the present invention may be used to selectively sinter powder. Advantageously, the apparatus of the present invention is used to selectively melt powder. The powder may, for example, comprise plastic powder, ceramic powder or metal powder. Preferably, the apparatus is arranged to deposit and solidify metal powder. For example, metal powders such as steel (e.g. steel grade 1.2709), Stainless steel, titanium, cobalt chrome etc may be used.

According to a second aspect, the present invention provides a method of selectively solidifying a powder layer deposited on a powder bed, comprising the steps of; passing a flow of gas over the powder bed along a predefined gas flow direction, and scanning a laser beam over the powder layer to selectively solidify at least part of the powder layer to form a required pattern, the required pattern being formed from a plurality of stripes or stripe segments, each stripe or stripe segment being formed by advancing the laser beam along the stripe or stripe segment in a stripe formation direction, characterised by the stripe formation direction always being at least partially opposed to the predefined gas flow direction. The method may include any of the preferred features described for the corresponding apparatus of the first aspect of the present invention.

According to a further aspect, the invention provides selective laser melting apparatus, comprising; a powder bed onto which a layer of powder can be deposited, a gas flow device for passing a flow of gas over the powder bed along a predefined gas flow direction, and a laser scanning unit for scanning a laser beam along a scan path on a layer of powder deposited on the powder bed, the laser beam being selectively output as the scan path is traversed to allow selected regions of the layer of powder to be melted, wherein the direction along which the laser beam is moved is oriented relative to the gas flow direction so as to substantially prevent any particles ejected during laser melting from being carried by the gas flow into regions of the scan path that have yet to be scanned.

In a further aspect, the present invention extends to selective laser solidification apparatus, comprising; a powder bed onto which a powder layer can be deposited, a gas flow unit for passing a flow of gas over the powder bed along a predefined gas flow direction, and a laser scanning unit for scanning a laser beam over the powder layer to selectively solidify at least part of the powder layer to form a required pattern, the required pattern being formed from a plurality of stripes or stripe segments, wherein the flow of gas over the powder bed originates from a first side of the powder bed and the plurality of stripes or stripe segments are formed in reverse order of their proximity to the first side of the powder bed. The invention also extends to a corresponding method of operating selective laser solidification apparatus and may include any feature described herein.

In a further aspect, the present invention extends to selective laser solidification apparatus, comprising; a powder bed onto which a powder layer can be deposited, a gas flow unit for passing a flow of gas over the powder bed along a predefined gas flow direction, and a laser scanning unit for scanning a laser beam over the powder layer to selectively solidify at least part of the powder layer to form a required pattern, the required pattern being formed from a plurality of stripes or stripe segments, wherein the laser scanning unit generates a laser spot that is moved across the stripe or stripe segment to form a hatch line, each of the plurality of stripes or stripe segments being formed using a plurality of hatch lines that are advanced along the stripe formation direction, characterised in that all hatch lines are formed by moving the laser beam in the same line direction across the stripe or stripe segment, the line direction being at least partially opposed to the gas flow direction. The invention also extends to a corresponding method of operating selective laser solidification apparatus and may include any feature described herein.

In a further aspect, the present invention extends to selective laser solidification apparatus, comprising; a powder bed onto which a powder layer can be deposited, a gas flow unit for passing a flow of gas over the powder bed along a gas flow direction and, a laser scanning unit for moving a laser beam over the powder layer to selectively solidify at least part of the powder layer to form a required pattern, wherein the laser scanning unit moves the laser beam to form a series of hatch lines that are advanced over the powder layer along a hatch line movement direction, wherein the hatch line movement direction is at least partially opposed to the gas flow direction. The hatch lines may be use to form stripes, segments, shells or any shape. The hatch line movement direction may be different for different areas on the powder bed. The invention also extends to a corresponding method of operating selective laser solidification apparatus and may include any feature described herein.

BRIEF DESCRIPTION OF THE DRAWINGS

The invention will now be described, by way of example only, with reference to the accompanying drawings in which.

DETAILED DESCRIPTION

Figure 1:
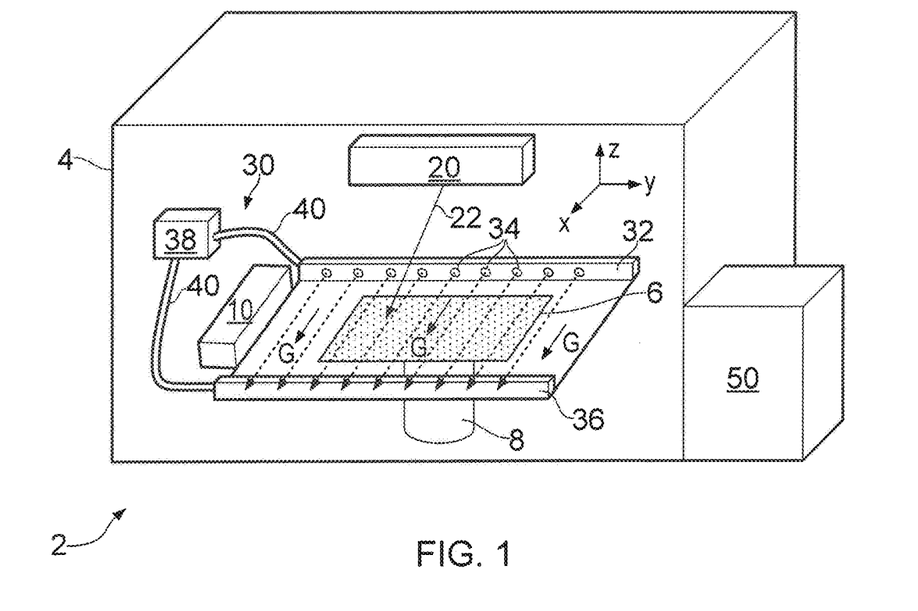
FIG. 1 is a schematic illustration of a selective laser melting machine.

Referring to FIG. 1, a known selective laser melting machine 2 is schematically illustrate.

The laser melting machine 2 comprises a build chamber or housing 4 in which there is provided a powder bed 6. The powder bed 6 can be raised and lowed (i.e. moved in the z-direction) by a piston mechanism 8. A powder dispensing and roller system 10 is provided for depositing a thin (e.g. 10-100 µm) powder layer onto the top of the powder bed 6. The powder used to form the powder layer is preferably a metal powder (e.g. 1.2709 grade steel powder).

A laser scanning unit 20 is also provided that comprises a high power continuous wave (CW) laser and scanning optics to direct a laser beam 22 towards the powder bed 6. The scanning optics also allow the laser beam 22 to be moved rapidly over the surface of the powder bed 6. The laser scanning unit 20 also includes an optical modulator to enable the laser beam 22 that impinges on the powder layer to be turned on and off as required.

A gas flow unit 30 is also provided. The gas flow unit 30 comprises a gas outlet bar 32 having a plurality of nozzles 34 for ejecting gas. A gas exhaust bar 36 is also provided for collecting gas. A pump 38 is used to draw in gas from the gas exhaust bar 36 and to pump gas to the nozzles 34 of the gas outlet bar 32. Suitable gas tubing 40 is provided to connect the gas outlet bar 32 and gas exhaust bar 36 to the pump 38. In use, gas flows from the gas outlet bar 32 to the gas exhaust bar 36. There is thus a predefined gas flow within the machine; i.e. gas is passed over the powder bed along the gas flow direction G.

The laser melting machine 2 is operated, under the direction of a controller 50, as follows. Firstly, a substrate plate is affixed to the piston mechanism. The substrate plate, which is preferably formed from the same material as the powder to be deposited on it, forms the base of the powder bed. The powder dispensing and roller system 10 is then used to dispense a powder layer of a certain thickness (e.g. 80 µm) onto the substrate plate. The laser scanning unit 20 then directs the laser beam 22 onto the powder layer and melts selected parts of the powder layer; i.e. selected regions of the powder layer are melted to the substrate plate. The path over the powder bed that is used by the laser is scanned is described in more detail below. Once the required pattern (e.g. cross-section) has been written into the powder layer, the piston 8 drops the powder bed 6, another powder layer is deposited on top of the existing (partly solidified) layer and the laser scanning unit then selectively melts the newly deposited powder layer. This process is then repeated, layer-by-layer, to form the required three dimensional object. During this fabrication process, a continuous supply of gas is passed over the powder bed along the gas flow direction U by the gas flow unit 30.

The illustration and description of FIG. 1 shows only the basic operation of known laser melting machines. The skilled person would be aware of further details of the machine construction and operation. It should be noted that the above schematic illustration is based on the M280 model of laser melting machine that is made by EOS GmbH.

Figure 2:
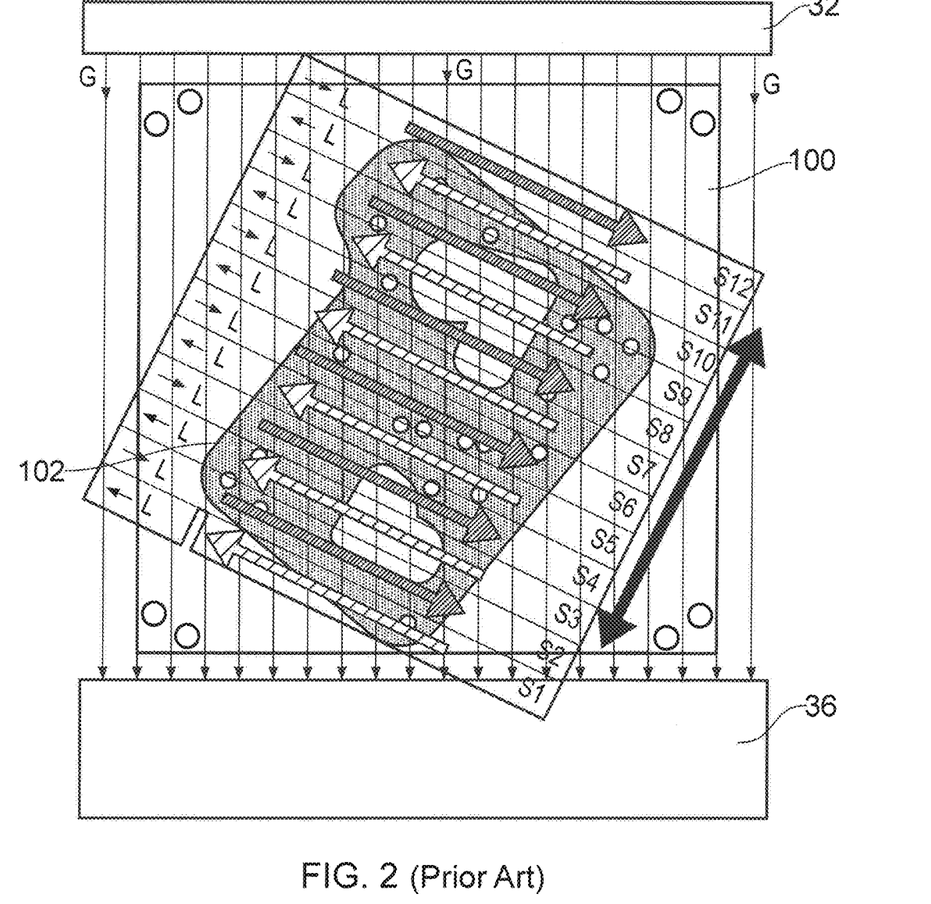
FIG. 2 shows a prior art technique for solidifying a layer of powder using hatch lines advanced along twelve stripes.

Referring next to FIG. 2, a prior art process for selectively melting a deposited powder layer using the machine described above with reference to FIG. 1 will be described. This process is implemented as standard on the EOS M280 machine mentioned above.

FIG. 2 illustrates a powder layer 100 that is to be selectively melted to form the solidified layer pattern 102. The powder layer 100 is deposited on the powder bed using the powder dispensing and roller system 10 that is described with reference to FIG. 1. Also shown is the gas outlet bar 32 and the gas exhaust bar 36 that provide a planar flow of gas along a gas flow direction G.

In order to solidify the powder layer 100 to form the solidified layer pattern 102, a plurality of stripes (labelled S1-S12 in FIG. 2) are defined. The stripes S1-S12 together define a square region that contains the area on the powder bed where the solidified layer pattern 102 is to be written. The laser scanning unit 20 generates a laser spot that is rapidly scanned across the width of the stripe (i.e. along a direction perpendicular to the elongate axis or length of the stripe) to form a so-called hatch line. In order to selectively melt powder along the length of the stripe, successive hatch lines are moved along the stripe in the direction L. In other words, the stripe is formed by movement of the hatch line along the stripe formation direction L. It should be noted that the hatch line formed by the laser may be the width of the stripe or it may be shorter than the width of the stripe if melting is not required across the whole stripe width at that particular position.

In the prior art example shown in FIG. 2, the stripe S12 is addressed first. This involves the laser scanning unit forming a hatch line that is moved from left to right along the stripe formation direction L to solidify the part of the layer pattern 102 falling with the S12 stripe. After stripe S12 has been written, the pattern of stripe S11 is written, which involves moving the hatch line along the stripe S11 in the stripe formation direction L. The stripe formation direction L for stripe S11 is opposite to the stripe formation direction L for stripe S12. It can thus be seen that the stripe formation direction L alternates between stripes as the stripes are written in turn (i.e. in the order S12 to S1). In the present example, all even numbered stripes (S2, S4, S4 etc) are formed using a hatch line that is moved from left to right whereas all odd numbered stripes (S1, S3, S5 etc) are formed using a hatch line that is moved from right to left.

Figure 3:
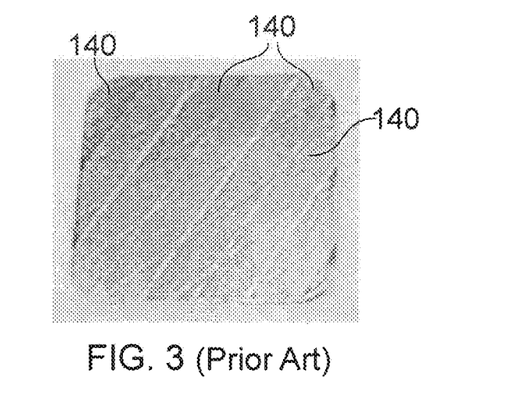
FIG. 3 is a photomicrograph that shows the variation in oxidisation that occurs using the prior art technique of FIG. 2.

The present inventors have found that this prior art technique has a number of disadvantages. As shown in FIG. 3, it has been found by the present inventors that stripes formed by hatch line movement in opposed stripe formation directions have different surface discoloration and surface roughness. In particular, the present inventors have found that oxidization and high surface roughness occurs fir even numbered stripes (S2, S4, S4 etc) that have been formed using a hatch line that is moved (in FIG. 2) from left to right. These even numbered stripes are identified by the label 140 in the photomicrograph of FIG. 3.

Figure 4:
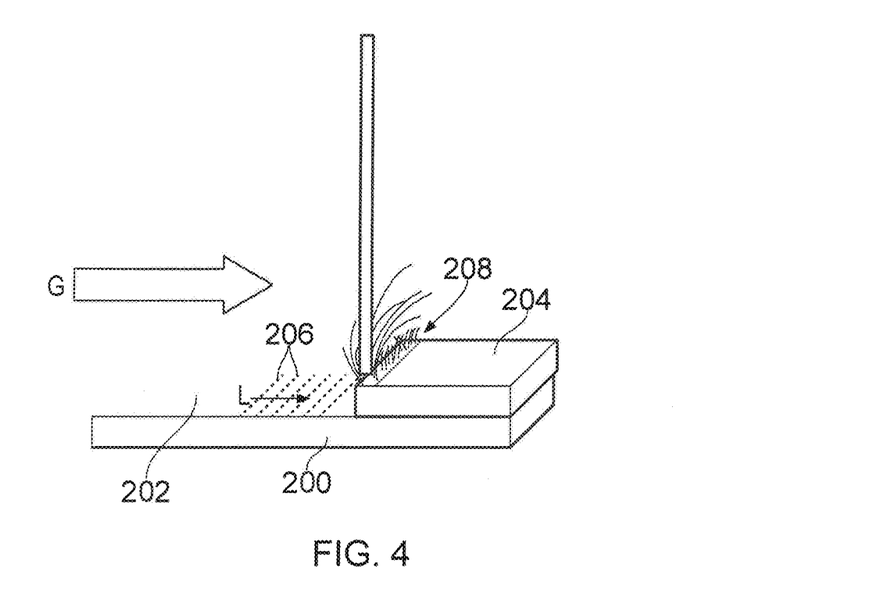
FIG. 4 illustrates the deposition of ejected material that occurs when the gas flow is in the same direction as the stripe formation direction (the "tail-wind" situation)
Figure 5:
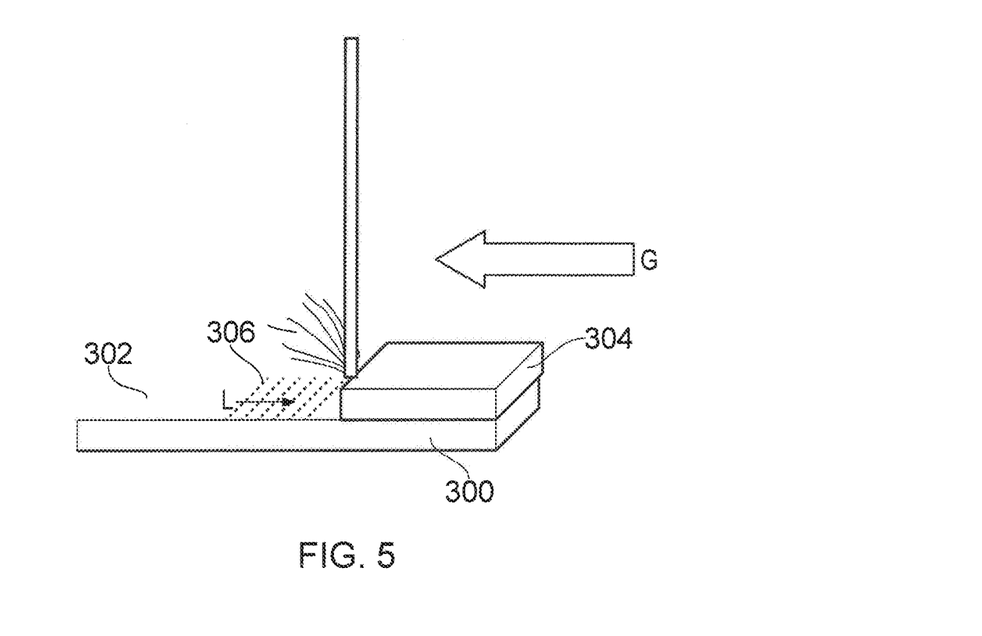
FIG. 5 illustrates the deposition of ejected material that occurs when the gas flow direction opposes the stripe formation direction as per the present invention.

Referring now to FIGS. 4 and 5, the effect of the gas flow direction relative to the stripe formation direction on layer formation will be described.

FIG. 4 shows a powder bed 200 that carries a layer of melted metal 202 and a powder layer 204 that has yet to be melted. The dashed lines 206 illustrate the hatch lines that were generated by the laser scanning unit to melt the powder that now forms the layer of melted metal 202. In this example, the gas flow direction G is the same as the stripe formation direction L. In other words, there a component of the gas flow direction that is in the same direction as the stripe formation direction L; this could be thought of as there being a "tail-wind".

The inventors have found that when the gas flow direction G and stripe formation direction L are aligned in the manner shown in FIG. 4, debris from the melting process (powder particles, partially melted clumps of powder particles and other residue/condensate from the melting process etc) are carried by the gas flow towards the part of the powder layer that has yet to be melted. This debris forms a surface region or bulge of contaminant 208 that moves along the stripe as the melt progresses. This not only results in a layer of non-uniform thickness being formed because of the different sized particles being deposited on the top of the unmelted powder, but it also reduces the laser power that reaches the powder layer thereby altering the melting conditions of the underlying powder layer. In particular, it has been found that sub-optimum oxidisation of the melted powder occurs and that the process generates a relatively high level of surface roughness and introduces defects etc. The effect shown in FIG. 4 accounts for the poorer quality of the even numbered stripes (S2, S4, S4 etc) shown in the photomicrograph of FIG. 3.

FIG. 5 shows a powder bed 300 that carries a layer of melted metal 302 and a powder layer 304 that has yet to be melted. The dashed lines 306 illustrate the hatch lines that were generated by the laser scanning unit to melt the powder that now forms the layer of melted metal 302. In this example, the gas flow direction G is opposed to the stripe formation direction L. In other words, there is no component of the gas flow direction that is in the same direction as the stripe formation direction L; i.e. there is no "tail-wind".

In this example, the flow of gas in the gas flow direction C acts to blow debris from the melting process away from the powder layer of the stripe that has yet to be melted. This has been found to prevent the formation of a bulge of contaminant as illustrated in FIG. 4. It should be noted that although FIG. 5 illustrates the use of gas flow direction C that is fully opposed to the stripe formation direction L, there may instead be an oblique angle between the gas flow direction C and the stripe formation direction L. Providing such an oblique angle also ensures that the debris is not deposited onto regions of the stripe that have just been melted.

It should also be noted FIGS. 4 and 5 illustrate embodiments in which the whole width of the stripe is melted by a plurality of full width hatch lines that are formed at successive points along the stripe formation direction L. It is, of course, possible to only melt selected parts of each stripe in order to construct the desired cross-section or pattern of melted material.

Figure 6:
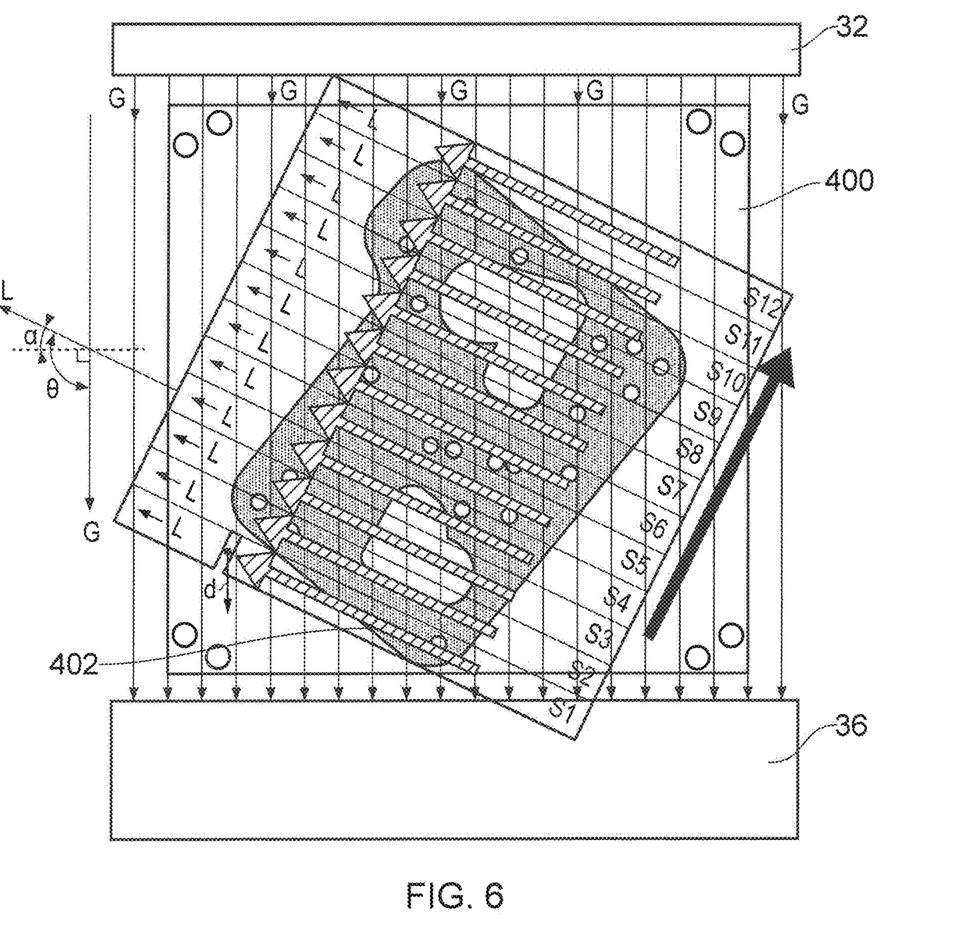
FIG. 6 shows a first example of a stripe scare of the present invention.

FIG. 6 illustrates the powder layer 400 that is to be selectively melted to form the solidified layer pattern 402. The powder layer 400 is deposited on the powder bed using the powder dispensing and roller system that is described with reference to FIG. 1. Also shown are the gas outlet bar 32 and gas exhaust bar 36 described with reference to FIG. 1 that provide a flow of gas along a gas flow direction G.

In order to solidify the powder layer 400 to form the solidified layer pattern 402, a plurality of stripes are melted in turn; these stripes are labelled as S1-S12 in FIG. 6. Unlike the prior art process described above with reference to FIG. 2, the stripes illustrated in FIG. 6 formed by moving the hatch line along each stripe in the same direction. In other words, the same stripe formation direction L is used for each of the stripes S1 to S12. In addition, the stripe formation direction L is arranged to differ from the gas flow direction C by the angle θ, which in this example is about 125°. Also shown in FIG. 6 is the angle α between the normal to the gas flow direction C and the stripe formation direction L. In this example, α has a value of around 35°.

Providing such an angle between the gas flow direction C and the stripe formation direction L means that any debris ejected during the melting process is carried by the flow of gas away from the part of the powder layer that is yet to be melted and also away from any material of that stripe that has just been melted. For example, debris ejected from the surface when melting the point P shown in FIG. 6 is carried along the vector d and away from the stripe S1. This helps ensure that the majority of the debris does not cover powder yet to be sintered and also does not adhere to powder that has recently been incited. The solidified layer pattern 402 formed by the melting process thus has a more uniform (less rough, fewer defects) surface than layers produced using alternating stripe formation directions as per the prior art process described with reference to FIG. 2.

In addition to each stripe being formed by moving a hatch line along the same stripe formation direction L, the stripes S1 to S12 are preferably formed in a specific order. In particular, the stripes S1 to S12 are preferably formed in reverse order of their proximity to the gas outlet bar 32. In other words, the stripe S1 nearest the gas exhaust bar 36 is formed first, then stripe S2 is formed, then stripe S3 etc. Forming the stripes in this order has the advantage that any debris ejected when writing one stripe does not disrupt the powder layer for stripes that have yet to be written. In particular, it can be seen that any debris ejected whilst melting the selected parts of the powder layer within stripe S1 does not get carried in the flow of gas over the stripes S2-S12. This means that a more uniform, substantially debris free, powder layer is present when each stripe is written.

Figure 7:
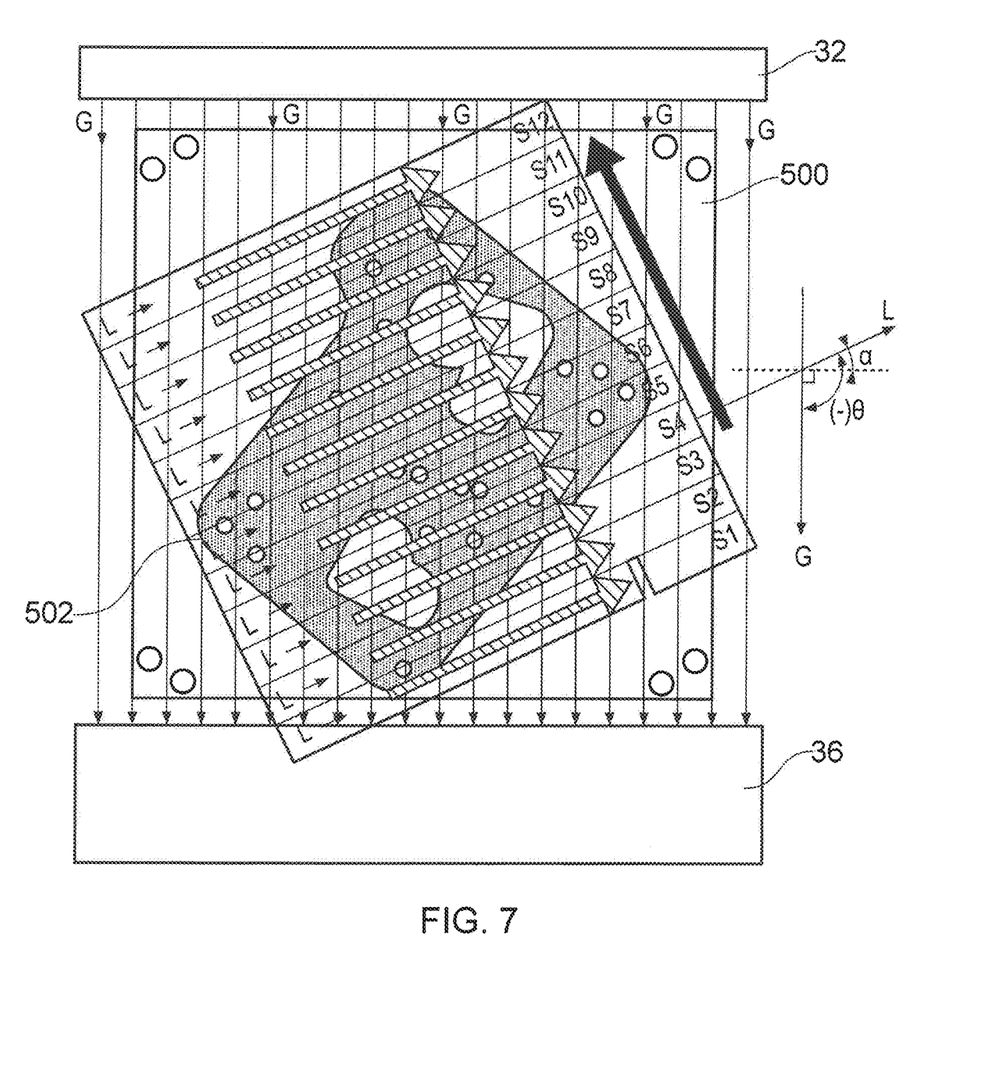
FIG. 7 shows a second example of a stripe scan of the present invention.

Referring to FIG. 7, a powder layer 500 is shown that is to be selectively melted to form the solidified layer pattern 502. The powder layer 500 is deposited on the powder bed using the powder dispensing and roller system that is described with reference to FIG. 1. Also shown are the gas outlet bar 32 and gas exhaust bar 36 described with reference to FIG. 1 that provide a flow of gas along a gas flow direction G.

In this example, the stripes S1 to S12 are again preferably formed in reverse order of their proximity to the gas outlet bar 32. Each stripe is formed by moving the hatch line along each stripe in the same direction. In other words, the same stripe formation direction L is used for each of the stripes S1 to S12. It can also be seen that the stripe formation direction L of FIG. 7 is a reflection of the stripe formation direction L shown in FIG. 6 about the gas flow direction. In other words, the stripe formation direction L is arranged to differ from the gas flow direction G by the angle −θ in FIG. 7. The arrangement of 7 thus has similar benefits to that of FIG. 6.

In addition to optimising the stripe formation direction L, it should be remembered that each stripe is preferably formed using a series of hatch lines. These hatch lines a formed by scanning a laser spot across the stripe; i.e. the hatch line is formed by moving a laser spot along a line that is perpendicular to the stripe formation direction L. It has further been found that a further improvement to the uniformity of stripe formation can be obtained by altering the hatch line formation process. This will now be explained with reference to FIGS. 8A, 8B and 8C.

Figure 8A:
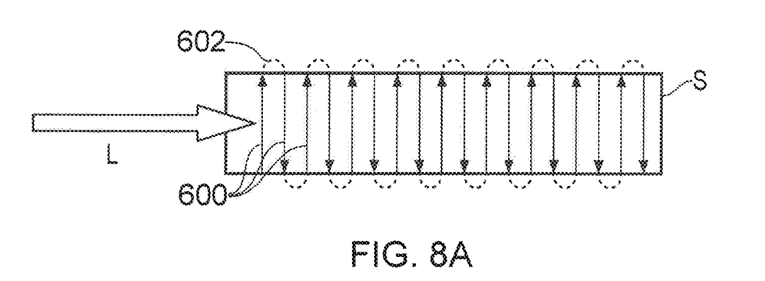
FIGS. 8A, 8B and 8C show three options for forming hatch lines by rapid scanning of a laser beam across the width a stripe.

Referring to FIG. 8A, there is shown a prior art method for scanning a laser spot back and forth across the width of a stripe S to form a succession of hatch lines 600 along the stripe formation direction L. The dashed lines 602 illustrate the notional paths at the end of each hatch line 600 that are traversed (with the laser beam deactivated) in order to appropriately position the laser beam ready for formation of the next hatch line. For convenience, the series of hatch lines of FIG. 8A can be termed bidirectional hatch lines.

The technique of hatch line formation shown in FIG. 8A has the advantage that the successive hatch lines can be formed at high speed because the beam steering optics of the laser scanning unit only need to provide a small amount of (notional) laser beam movement between the end of one hatch line and the start of the next hatch line. It has been found, however, that the direction of hatch line formation relative to the gas flow direction can also affect the quality and uniformity of the layer that is generated from melting the powder layer within a stripe. It has also been found that the non-uniformity caused by this effect increases as the magnitude of the angle α (which is described above with reference to FIGS. 6 and 7) between the normal to the gas flow direction G and the stripe formation direction L reduces.

Figure 8B:
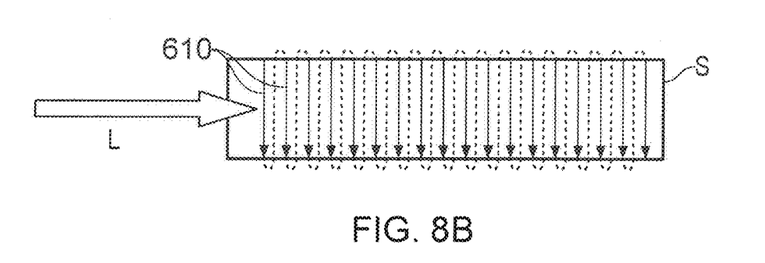
Figure 8C:
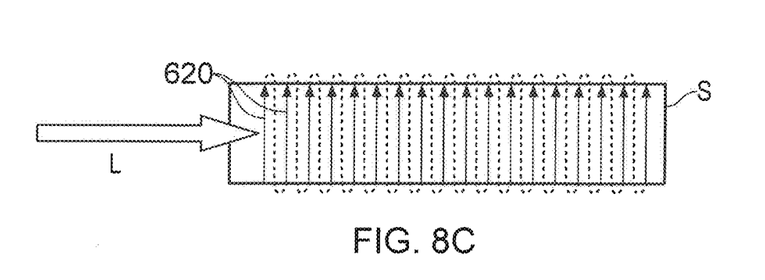

Forming the hatch lines by always scanning the laser beam in the same direction across the stripe can thus improve the uniformity of the melted layer. FIG. 8B shows how hatch lines 610 can be formed by always scanning the laser spot from the top to the bottom of a stripe S. FIG. 8C shows how hatch lines 620 can be formed by always scanning the laser spot from the bottom to the top of a stripe S. For convenience, the series of hatch lines of FIGS. 8B and 8C can be termed unidirectional hatch lines. Although the formation of unidirectional hatch lines can improve stripe quality, such an improvement is accompanied by an increase in the time it takes to form a series of hatch lines. In particular, there is an additional delay associated with the scanning optics of the laser scanning unit moving back across the stripe to allow the next hatch line to be formed. It is thus preferable to only use unidirectional hatch lines when they provide a sufficiently significant improvement; e.g. when the magnitude of the angle α between the normal to the gas flow direction G and the stripe formation direction L reduces sufficiently so that the formation of unidirectional hatch lines has a benefit.

It should also be noted that the direction of formation of the unidirectional hatch lines relative to the stripe formation direction L will depend on the orientation of the stripe being formed relative to the gas flow direction G. For example, the stripes formed in FIG. 6 would benefit from being formed from the unidirectional hatch lines of FIG. 8B whilst the stripes formed in FIG. 7 would benefit from being formed from the unidirectional hatch lines of FIG. 8C. In both cases, the direction of beam movement during hatch line formation is arranged to at least partly oppose the gas flow direction G. This means that the majority of debris associated with powder melting is blown clear of powder within the hatch line that is yet to be melted. The formation of bidirectional or unidirectional hatch lines may thus be varied as required for different stripe orientations relative to the gas flow direction.

Figure 9:
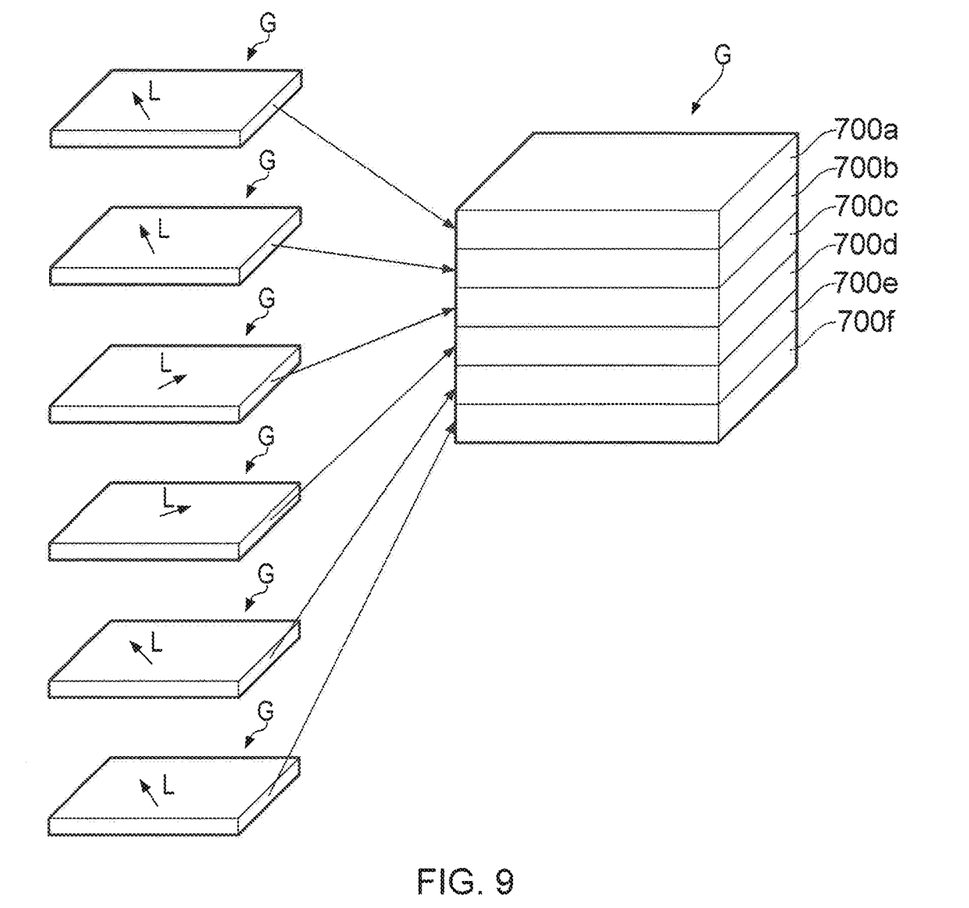
FIG. 9 illustrates how the stripe formation direction can be varied between layers.

Referring to FIG. 9, the process of constructing a three dimensional object 710 from a plurality of melted layers (700a-700f) is illustrated. Each layer 700a-700f may be formed by a process that involves selectively melting each layer using multiple stripes, each stripe of one layer being formed along a common stripe formation direction L. The stripe formation direction L may vary between layers, but it is preferred that the gas flow direction is always at least partially opposed to the stripe formation direction for each layer. In this manner, the benefits of the present invention are obtained for each layer in a three dimensional object. The use of different stripe formation directions L for each layer may also mean that certain layers can be formed using bidirectional hatch lines whilst other layers are formed using unidirectional hatch lines. The benefits of altering the stripe formation direction between layers has also been described previously in U.S. Pat. No. 8,034,279 (EOS). A difference in stripe formation direction between adjacent layers of at least 30° is used in this example, but other different angles may be implemented. For example, the rotation angle between adjacent layers may be more than 40° or it may be 67°. The rotation angle between adjacent layers is preferably less than 80°. Again, it should be noted that it is preferred that each layer (or at least the majority of the layers) meets the requirement that the gas flow direction is always at least partially opposed to the stripe formation direction.

It should also be noted that although the melting process may take place by advancing hatch lines along a stripe, there may be other processing steps that do not requires such tight control over the stripe formation direction relative to the gas flow direction. For example, the laser scanning unit may perform a contour scan before and/or after a layer has been melted by advancing hatch lines along a stripe. The contour scan may simply scan the laser beam around the contour of an object to re-melt and solidify the metal to improve surface quality. In such a contour scan the path of the laser beam spot may take on any orientation relative to the gas flow direction. This has not been found to have a detrimental effect because the amount of debris generated by such a contour scan is minimal.

Figure 10:
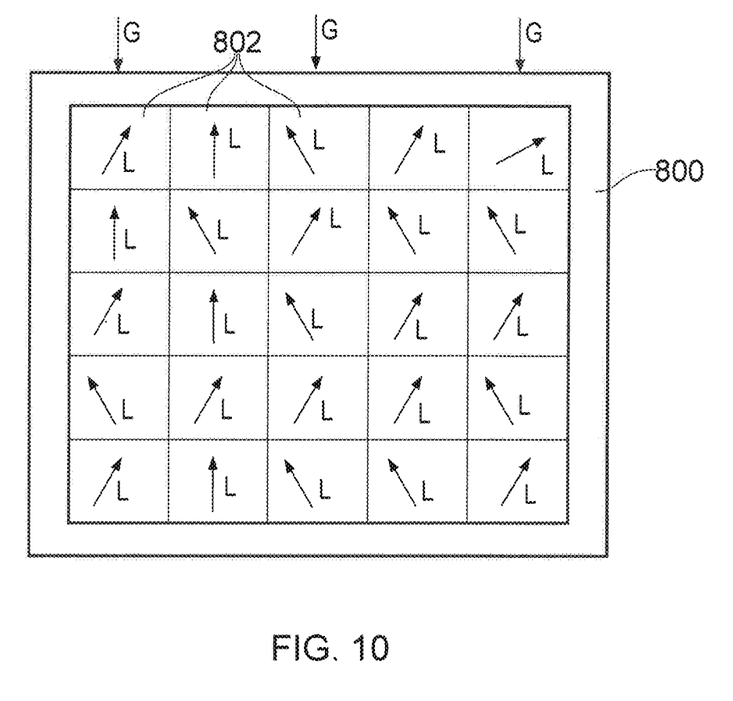
FIG. 10 illustrates how multiple stripe segments may be formed within a layer in a checkerboard pattern.

Referring to FIG. 10, it is also illustrated how the present invention can be applied to layer formation using stripe segments. In particular, FIG. 10 illustrates a powder layer 800 that is to be melted to form a desired pattern (not shown). The powder layer 800 may be deposited using the powder dispensing and roller system described with reference to FIG. 1. As described previously, a planar flow of gas is provided over the powder layer along the direction G.

The desired pattern is written to the powder layer 800 by dividing the layer into a plurality of stripe segments 802. Each stripe segment 802 is formed separately. The stripe segments may be written in any order. As also shown in FIG. 10, the stripe formation direction may be different for the different stripe segments (although it may be the same). However, the gas flow direction G is always at least partially opposed to the stripe formation direction L of each stripe segment.

The stripe segments shown in FIG. 10 are equally sized and regularly arranged in a grid or checkerboard type pattern. It is, however, possible for the stripe segments or sections to be different shapes and/or sizes. The stripe segments may also be spaced irregularly. For example, stripe segments may be provided as shells or islands formed in local areas on the substrate. The stripe segments or sections may also comprise any of the arrangements described previously in US2005/0142024 (but with the gas flow direction controlled relative to the stripe formation direction in accordance with the present invention).

The skilled person would also recognise the other variations and additions to the technique of the present inventions that are possible.

The invention claimed is:

1. A method of selectively melting a plurality of powder layers deposited on a powder bed to form a three-dimensional object, the method comprising the steps of:
    passing a flow of gas over the powder bed along a predefined gas flow direction; and
    scanning a laser beam along a scan path on each of the plurality of powder layers to selectively melt at least part of each of the powder layers to form a required pattern,
    wherein, for each of the plurality of powder layers, a direction along which the laser beam is moved is orientated relative to the gas flow direction to substantially prevent any particles ejected during the selective melting from being carried by the flow of gas into regions of the scan path that have yet to be scanned.

2. The method according to claim 1, wherein the step of scanning the laser beam along the scan path comprises moving the laser beam to form a series of hatch lines that are advanced over at least one of the plurality of powder layers along a hatch line movement direction.

3. The method according to claim 2, wherein the hatch line movement direction is at least partially opposed to the gas flow direction.

4. The method according to claim 2, wherein the hatch line movement direction is different for different areas on the powder bed.

5. The method according to claim 1, wherein the gas flow direction varies as a function of the position on the powder bed.

6. The method according to claim 1, wherein the gas flow direction is substantially uniform over the powder bed.

7. The method according to claim 1, wherein the flow of gas is a substantially planar flow of gas along the gas flow direction.

8. The method according to claim 1, wherein the flow of gas is at a rate that does not disturb a deposited one of the plurality of powder layers.

9. The method according to claim 1, wherein each of the plurality of powder layers comprises metal powder.

10. A method of selectively melting a plurality of powder layers deposited on a powder bed to form a three-dimensional object, the method comprising the steps of:
passing a flow of gas over the powder bed along a predefined gas flow direction; and
scanning a laser beam over each of the plurality of powder layers to selectively melt at least part of each powder layer to form a required pattern, the required pattern of each powder layer being formed from a series of hatch lines that are advanced over each powder layer along a hatch line movement direction,
wherein the hatch line movement direction is at least partially opposed to the gas flow direction for each of the plurality of powder layers.

11. The method according to claim 10, wherein the flow of gas is a substantially planar flow of gas along the gas flow direction.

12. The method according to claim 10, wherein each hatch line of the series of hatch lines is formed by moving the laser beam back and forth.

13. The method according to claim 10, wherein each hatch line of the series of hatch lines is formed by moving the laser beam in a same line direction, the line direction being at least partially opposed to the gas flow direction for each hatch line of each of the plurality of powder layers.

14. The method according to claim 10, wherein each of the plurality of powder layers comprises metal powder.

15. A method of selectively melting a plurality of powder layers deposited on a powder bed to form at least one three-dimensional object, the method comprising the steps of:
passing a substantially planar flow of gas over the powder bed along a predefined gas flow direction, the flow of gas originating from a first side of the powder bed; and
scanning a laser beam over each of the plurality of powder layers to selectively melt at least part of each of the powder layers to form a required pattern, the required pattern of each of the powder layers being formed from a plurality of stripes or stripe segments, and each stripe or stripe segment being formed by advancing the laser beam along the stripe or stripe segment in a stripe formation direction,
wherein the plurality of stripes or stripe segments are formed in reverse order of their proximity to the first side of the powder bed.

16. The method according to claim 15, wherein each of the plurality of powder layers comprises metal powder.

* * * * *